United States Patent [19]

Ukai

[11] Patent Number: 4,782,196
[45] Date of Patent: Nov. 1, 1988

[54] COMPOSITE STRAND FOR TRANSMITTING ELECTRIC OR OPTICAL SIGNALS

[75] Inventor: Ryouichi Ukai, Sagamik, Japan

[73] Assignee: Maruichi Sangyo Kabushiki Kaisha, Tokyo, Japan

[21] Appl. No.: 613,980

[22] Filed: May 25, 1984

[30] Foreign Application Priority Data

Nov. 30, 1983 [JP] Japan ............................ 58-226125

[51] Int. Cl.⁴ .................... H01B 7/06; H01B 13/00
[52] U.S. Cl. .................... 174/131 A; 57/9; 57/16; 57/215; 57/216; 57/226; 156/50; 156/52
[58] Field of Search .............. 174/69, 131 R, 131 A, 174/131 B, 113 C; 57/9, 13, 15, 16, 215, 216, 219, 222, 225, 226; 156/47, 50, 52

[56] References Cited

U.S. PATENT DOCUMENTS

| | | | |
|---|---|---|---|
| 2,186,531 | 1/1940 | Kendrick | 174/69 |
| 2,456,015 | 12/1948 | Orser | 174/69 |
| 2,764,625 | 9/1956 | Ingmanson | 174/69 |
| 3,011,302 | 12/1961 | Rupprecht | 57/225 |
| 3,100,240 | 8/1963 | McKirdy | 174/69 |
| 3,124,924 | 3/1964 | Smith | 57/225 |
| 3,277,231 | 10/1966 | Downey et al. | 174/69 |
| 3,334,177 | 8/1967 | Martin | 174/113 R |
| 3,453,374 | 7/1969 | Natwick | 174/69 |
| 3,823,253 | 7/1974 | Walters et al. | 174/69 |
| 3,991,551 | 11/1976 | Petree | 57/226 |

FOREIGN PATENT DOCUMENTS

| | | | |
|---|---|---|---|
| 2827707 | 1/1979 | Fed. Rep. of Germany | 57/225 |
| 2827080 | 12/1979 | Fed. Rep. of Germany | 57/15 |
| 1348475 | 12/1964 | France | 174/69 |

Primary Examiner—Morris H. Nimmo
Attorney, Agent, or Firm—Arnold S. Weintraub

[57] ABSTRACT

A support strand is formed of a non-extensible thread wound around an elastic thread in order to restrain the extension of the non-extensible thread within such a limit that the coil of the wound, non-extensible thread can follow movement of the elastic thread. A signal transmitting strand is further wound around the outer surface of the support strand to form the composite strand.

8 Claims, 2 Drawing Sheets (A) NORMAL (B) EXTENDED (A) NORMAL (B) EXTENDED (A) NORMAL (B) EXTENDED

COMPOSITE STRAND FOR TRANSMITTING ELECTRIC OR OPTICAL SIGNALS

BACKGROUND OF THE INVENTION

1. Field of the Invention

This invention relates to a strand for transmitting an electrical or optical signal, and more particularly, to a composite strand wherein a strand for transmitting an electrical or optical signal is wound around a support or core strand consisting of a center strand of an elastic thread and a non-elastic thread wound around the center strand such that the composite strand is restricted for tension in certain directions by virtue of the non-elastic thread so as to prevent its breakage due to external forces, such as tension and shock.

2. Description of the Prior Art

Heretofore, signal transmitting strands, particularly, those making up a telephone cable have been composed of a copper wire material and a covering. Recently, a new material, such as an optical fiber, has been used.

In order to reduce material costs, these kind of cables use a unit strand made of signal transmitting wire having as fine diameter or thickness as possible. Such cables are buried underground or used as serial cables and are liable to be exposed to various external forces such as tension, shock and so on. Consequently, when the extent of the stress caused by such external force is greater than the breakage stress of the signal transmitting strand, a part or whole of the strand will break. This necessitated use of a thicker signal transmitting strand.

In view of these problems, signal transmitting strand made of composite strand as shown in FIG. 5 provides a strand made of a flat copper wire is wound around a center strand composed of synthetic resinous fiber in order to strengthen the strand for tensioning.

However, since the core strand is substantially non-extensible, applied tension force is also directly exerted to the flat copper strand, accordingly, if the center strand breaks it also results in breakage of the flat copper strand.

A copper wire constituting a strand making up a telephone cable should be thin to eliminate excessive material costs. This thinness limits its strength to withstand an applied tension force. If an amount of tension close to the limit of breaking stress is applied repeatedly, the signal transmitting strand which constitutes the composite strand will fatigue thereby impairing its endurance.

Such composite signal transmitting strands are not always gathered to form a cable, but also may be used as an individual signal place strands wherein the length must be arranged in a very exact manner. However, often it is cut somewhat shorter than that required due to errors in cutting, and thus will become unusable.

SUMMARY OF THE INVENTION

This invention aims to obviate such problems.

Accordingly, an object of the present invention is to provide a composite signal transmitting strand which can be elastically extended or contracted within a certain range and should not be readily broken by any external forces.

Another object of the invention is to provide a signal transmitting strand which still can be used satisfactorily, even if, due to an error in cutting, it is cut somewhat shorter than it is actually required.

It is a further object of the present invention to provide a composite signal transmitting strand having a diameter or thickness as fine as possible so as to reduce material costs.

The composite signal transmitting strand according to the present invention comprises a signal transmitting strand wound around a support strand consisting of a center strand made of an elastic thread or threads extending as a central core and substantially non-extensible fibers wound around the center strand.

Generally, the elastic fiber can be extended more than 200 percent in length; however, in carrying out the present invention such high extent of extension is unnecessary and disadvantageous.

According to the present invention, an elastic strand is used as a center core and another strand or thread is wound around the elastic center strand by a covering means generally used in spinning mills. This constitutes a core or support strand. The wound non-extensible strand restricts deformation of the core strand under tension or compression to the range within which the wound strand can follow the extension of the center strand. This is similar to the elongation of a coil spring through a change in the length of its coil pitch. A wire or strand of signal transmitting material is further wound around the support strand to constitute a composite signal transmitting strand of the present invention. The winding pitch of the strand of the signal transmitting material must be such that the axial length of the coil of the signal transmitting material is the same as or longer than the axial length of the elongated support strand when under maximum tension.

The signal transmitting strand referred to herein may include any typical electrically conducting material such as metal wire or strip, or carbon fiber. It may also include material for transmitting other kinds of signals, such as optical fiber. The composite signal transmitting strand constructed in the manner mentioned above can be extended within the extensible range of the support or core strand. Because of its restrained extension, the composite signal transmitting strand can absorb external force such as tension or shock crossing its axis or in an axial direction. The composite strand will not be broken provided that the applied external stress is lower than the breaking stress of the non-elastic strand. In addition, if the composite strand is cut into a length somewhat shorter than is actually required, the cut strand still can be used by stretching it to the desired length.

DESCRIPTION OF THE PREFERRED EMBODIMENTS

Figure 1:
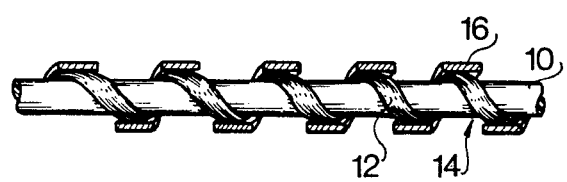
FIG. 1(A) is a sectional view of the composite strand for transmitting signal using a signal transmitting strand made of a flat copper wire.
FIG. 1(B) is a sectional view of the composite signal transmitting strand in an extended state.
Figure 1:
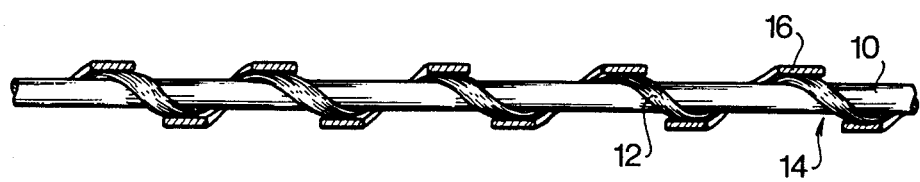

In making the composite signal transmitting strand shown in FIG. 1, a nylon or polyester fiber 12 of 140 denier is wound around an elastic polyurethane thread 10 of 840 denier to make up a core or support strand 14. A signal transmitting strand 16 made of a flat copper wire formed by rolling a copper wire of 0.3 mm diameter is further wound around the support strand 14 with a pitch of 500 turns/meter to constitute a composite strand having an overall diameter of 0.32 mm.

The composite strands thus formed can be extended from the normal state shown in FIG. 1(A) into that shown in FIG. 1(B). The extensible limit of the support strand 14, due to the restriction on tensioning given by the substantially non-extensible fiber 12 prevents any tensional breakage force from being directly exerted on the signal transmitting strand 16. If an external shock or tension is applied to the composite signal transmitting strand, such force can be absorbed by the whole of the composite strand without exerting any tensile force directly to the signal transmitting strand 16.

Figure 2:
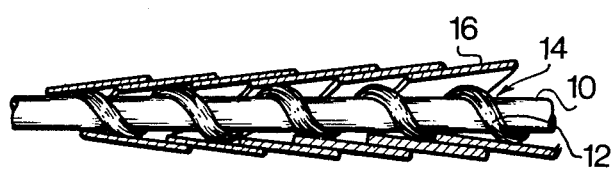
FIG. 2(A) is a sectional view of the composite strand utilizing a signal transmitting strand made of a flat copper wire of a larger width.
FIG. 2(B) is a sectional view of the composite signal transmitting strand shown in FIG. 2(A) in an extended state.
Figure 2:
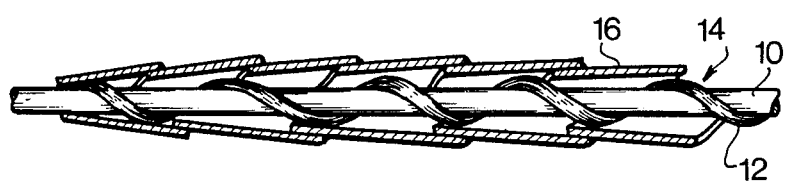

A second embodiment of a composite signal transmitting strand is shown in FIG. 2 and comprises a core or support strand 24 made up of a nylon or polyester fiber 22 of 140 denier wound around the central strand 20 made of an elastic polyurethane thread of 840 denier.

A signal transmitting strand 26 of a flat copper wire having a width twice that of the copper wire shown in FIG. 1 is formed by rolling a copper wire of 0.6 mm diameter around the strand 24. The stand 26 is wound around the support strand 24 with a pitch of 500 turns/meter to constitute a composite strand having an overall diameter of 0.32 mm. In the composite strand made in the aforesaid manner, adjacent coils of the signal transmitting strand 26 transversely overlap with each other with a larger width when it is in the normal or unextended state as shown in FIG. 2(A). These adjacent coils of the strand remain overlapped even when the strand is extended. When extended the extent of overlap is smaller as shown in FIG. 2(B).

One application for which the composite strand of this construction is ideally intended is to transmit a signal at a comparatively high voltage or current.

Figure 3:
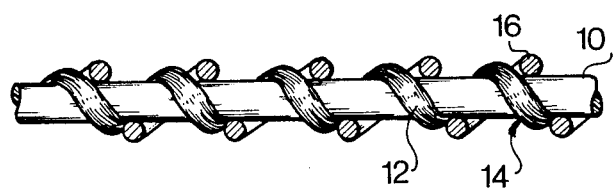
FIG. 3 is a sectional view of the composite signal transmitting strand using a round copper wire as a signal transmitting strand.

In another embodiment, a composite strand for transmitting signal as shown in FIG. 3 is formed by using an elastic polyurethane thread or strand of 840 denier as a center strand 30, winding a strand of nylon or polyester fiber 32 of 140 denier around the central strand 30 to constitute a core or support strand 34. A signal transmitting strand 36 made of a round copper wire of 0.2 mm diameter with a pitch of 500 turns/meter to constitute the composite strand having an overall diameter of 0.32 mm is further wound around the central strand 20.

The composite strand formed in this way is somewhat less flexible as compared with those produced in accordance with the two embodiments shown in FIG. 1(A), 1(B), 2(A) and 2(B). However, if a signal transmitting strand 36 of smaller diameter is selected, flexibility of the composite strand shown in FIG. 2 will not be lowered substantially and can display substantially the same function and meritorious effects as that shown in FIGS. 1(a and 2(B).

Figure 4:
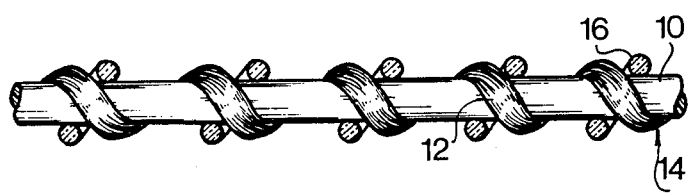
FIG. 4 is a sectional view showing the composite signal transmitting strand using a round optical fiber as a signal transmitting strand.
Figure 5:
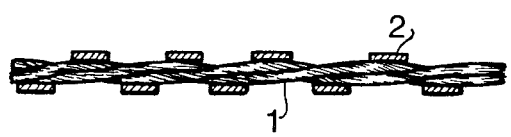
FIG. 5 is a sectional view of the conventional signal transmitting signal.

The composite signal transmitting strand shown in FIG. 4 comprises a core or support strand 44 of a nylon or polyester fiber of 140 denier wound around the central strand 40 of elastic polyurethane thread of 840 denier and a signal transmitting strand 46 of a round wire or known optical fiber having a diameter of 0.3 mm which is further wound around the core or support strand 44 with a pitch of 500 turns/meter to constitute a composite strand having an overall diameter of 0.33 mm. The composite strand of this embodiment is somewhat less flexible then those described above. However, since an optical fiber has been selected for the signal transmitting strand 46, the strand can be used for transmitting a beam of light instead of an electric signal.

Although not illustrated in the drawings, other materials, such as aluminum, aluminum alloys or carbon fibers also can be used to form the strands.

In these versions of the present invention, low cost rubber can be used as a material for the elastic thread. This is not appropriate where the strand for transmitting signal is made of copper as constituents of the copper material can chemically attack and degrade the rubber. Accordingly, it is impossible to combine the strand made of copper wire or a strip with elastic rubber strand. As such it is rather preferable to select polyurethane as the material for the strand as already mentioned.

The composite signal transmitting strand of this invention can absorb external force exerted as shock or tension, either along or crossing the axial line of its extension, by virtue of its restrained extension. Accordingly, if the applied external force is lower than the breaking stress of the non-elastic thread, the signal transmitting strand will not be broken. In addition, if the composite strand is cut shorter than it is actually required, the cut strand can be still used by stretching it to the required length without causing breakage of the signal transmitting strand.

What is claimed is:

1. A composite strand for transmitting an electric signal comprising:
   (1) a support strand including:
      (a) an elastic center thread; and
      (b) a non-extensible fiber helically wound around the center thread to limit extension of the center thread; and
   (2) a signal transmitting strand helically overlaying the non-extensible helically wound fiber, the signal transmitting strand having a length at least as long as the length of the non-extensible helically wound fiber and having a sufficient width such that when it is wound around the support strand that adjacent coils of the wound signal transmitting strand partly overlap in the axial direction when the composite strand is fully extended.

2. A method of making a composite strand for transmitting an electric signal comprising:
   helically winding a non-extensible fiber around an elastic polyurethane center thread to form a support strand of delimited extension having coils of non-extensible thread in a spaced apart relationship thereon; and
   helically winding a signal transmitting strand around the support strand to form adjacent coils of the signal transmitting strand helically overlaying each coil of non-extensible fiber at a pitch with a suitable gap to extend with the extension of the support strand without breaking.

3. The method of claim 3 wherein the signal transmitting strand is a copper wire.

4. The method of claim 2 wherein the signal transmitting strand is a flat wire.

5. The method of claim 2 wherein the signal transmitting strand is a flat copper wire.

6. The method of claim 2 further including the step of:

helically winding the signal transmitting strand of flat copper wire around the support strand such that adjacent coils of the signal transmitting strand helically overlay the non-extensible fiber and are partly overlapped in an axial direction and there remains an overlapped margin at a width of each coil even when the composite strand as a whole is extended to its full extent.

7. The method of claim 2 further including the step of:

winding the signal transmitting strand around the support strand with a pitch having a predetermined gap.

8. The method of claim 7 wherein the signal transmitting strand is made of round copper wire and is wound around the support strand with a pitch forming a predetermined coil gap when the composite strand is in its non-extensible state.

* * * * *